United States Patent Office 2,977,328
Patented Mar. 28, 1961

2,977,328

ODOR IMPROVEMENT OF RESIN BEADS MADE THROUGH THE SULFONIUM SALT PROCESS

Leonard A. Mattano and Melvin J. Hatch, Midland, Mich., assignors to The Dow Chemical Company, Midland, Mich., a corporation of Delaware No Drawing. Filed July 29, 1958, Ser. No. 751,650

2 Claims. (Cl. 260—2.1)

This invention concerns odor removal from resins derived from poly(vinylaryl sulfonium) halides.

In U.S. patent application Serial No. 674,014, filed July 25, 1957, there are disclosed resins derived from poly(vinylaryl sulfonium) halides by reacting the latter with a water-soluble nucleophile, e.g., disodium imino diacetate, sodium sulfite, sodium glycinate, trisodium mercaptosuccinate, dimethyl ethanol amine, diethylene triamine, etc. Also in U.S. patent application Serial No. 734,397, filed May 12, 1958, there are disclosed thioether cation exchange resins containing vinylbenzylthio groups and having the following repeating units:

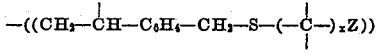

wherein

represents a hydrocarbonyl or substituted hydrocarbonyl group of the aliphatic, aromatic or cycloaliphatic series, $x$ is an integer not greater than 2 and Z is $-CO_2H$, $-P(O)(OH)_2$, $-SO_3H$, or exchangeable salts thereof. Such resins are prepared by reacting a poly(vinylbenzyl sulfonium) halide with a water-soluble mercaptide having the formula

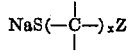

wherein

$x$ and Z have the significance previously given.

The resins referred to are advantageously used as ion exchangers. However, they have an objectionable sulfide odor which limits their use where such an odor is undesirable. The sulfide odor is attributable in part to retained sulfide liberated during the course of their preparation and in part to a minor proportion (up to several percent) of unreacted poly(vinylbenzyl sulfonium)halide. The sulfides contain one or two alkyl groups containing between one and 4 carbon atoms and/or correspondingly one or 2 hydroxyalkyl groups containing between 2 and 4 carbon atoms, e.g., dimethyl, diethyl, methyl hydroxyethyl, dipropyl, dibutyl, etc. sulfides.

It has now been discovered that the offensive sulfide odor attributable to such sulfur compounds can be removed by treating such particulate ion exchange resins with ammonia, suitably with aqueous ammonia and advantageously at reflux, approximately 90° C., until a test portion after water-washing no longer has an offensive odor. Usually several hours' refluxing with aqueous ammonia or equivalent is required. At least an equimolar proportion of ammonia, resin basis, is used, preferably an excess. The amount of excess is not important, since excess ammonia can be recovered by condensation. While reflux temperature is preferred, temperatures between about 40° C. and reflux, about 90° C., are operable, a proportionately longer reaction time being required at temperatures lower than about 90° C. From 0.5 to 10 hours' reaction time at a gradually increased temperature from 40° to 90° C. using aqueous ammonia is preferred. If desired, the resin can be washed with water at room temperature until it is free of ammonia. In many instances, this is unnecessary.

In practice, the water-wet resin beads containing sulfur in the sulfide and sulfonium form are mixed with about 0.1 to 20 moles of ammonia, preferably from about 0.3 to 5 moles of ammonia per mole of sulfonium derived resin, and the mixture is heated until a test portion, water-washed, no longer has an offensive odor. Alternatively, ammonia gas can be bubbled into a water suspension of the resin beads (containing about 200 to 500 mls. water per mole of resin beads) with mixing. Thereafter the resin beads are separated from the aqueous reaction medium, advantageously by filtering, and water washed if desired. Beads so processed have a barely perceptible sulfide odor, even after having been stored overnight in a closed jar.

The following examples illustrate specific embodiments of this invention.

*Example I*

A quantity of 100 grams of water-wet sulfonium resin beads, prepared by reacting one weight percent divinylbenzene-crosslinked polymeric vinylbenzyl chloride with dimethyl sulfide by the method shown in U.S. patent application Serial No. 674,014, was reacted with disodium iminodiacetate by the method shown in the same application. The washed water-wet cation exchange resin so obtained had an offensive sulfide odor. The water-wet beads were refluxed at 90° C. with 125 grams of aqueous 28 weight percent ammonia for about 16 hours. The beads were then washed free of ammonia with water. After they were stored overnight in a closed glass jar, a barely perceptible sulfide odor was noticeable.

Any of the resins prepared by the sulfonium route as described in U.S. patent application Serial Nos. 674,014 and 734,397 can be processed by the method of this invention to destroy the offensive sulfide odor which normally accompanies them.

*Example II*

The water-wet cation exchange resin prepared as in Example I was heated while stirred with 250 ml. of concentrated ammonium hydroxide and 250 ml. of water for one hour at 50° C. and one hour at 60° C. A sample of the so-treated resin was water-washed, neutralized with sulfuric acid and again water-washed. After storage in a closed bottle for 3 days, a barely perceptible sulfide odor was noticed.

*Example III*

The procedure of Example II was repeated at a temperature of 90° C. for 2 hours. When the washed resin was stored for 3 days in a closed glass jar, a barely perceptible sulfurous odor was noticed.

What is claimed is:

1. A method for removing offensive odors from ion-exchange resins having a malodor due to the presence therein of offensive sulfur compounds of the group consisting of dialkyl sulfides, di(hydroxyalkyl)sulfides, alkyl hydroxyalkyl sulfides and poly(vinylbenzyl sulfonium) halide, wherein the alkyl groups contain between 1 and 4 carbon atoms, the hydroxyalkyl groups contain between 2 and 4 carbon atoms and halide is a member of the group consisting of chloride and bromide, as impurities incidental to the preparation of ion-exchange resins which are heat reaction products of a poly(vinylbenzyl sulfonium)anion exchange resin having sulfonium group substituents which give rise to the malodorous sulfur compounds and a member of the group consisting of alkali metal sulfites; alkali metal salts of aminocarboxylic acids; alkali metal salts of amino-alkane sulfonates; alkali metal salts of aminoaryl sulfonates; alkali metal salts of aminoalkane phosphonates; alkali metal salts of mercaptides having substituent groups of the group consisting of $CO_2^-$, $-PO_3^=$ and $-SO_3^-$; polyethylene polyamines having up to 3 ethylene groups; primary aliphatic monoamines; secondary aliphatic monoamines; and tertiary aliphatic monoamines; by treating said malodorous resin in particulate form in water at a temperature between about 40° and about 90° C. with about 1/10 to about 20 moles of ammonia per mole of said ion-exchange resin until a test sample of the resin after water washing no longer has an offensive odor.

2. The method of claim 1, wherein the ammonia treated resin is washed free of ammonia with water.

References Cited in the file of this patent

UNITED STATES PATENTS 2,768,990    De Jong _____ Oct. 30, 1956